United States Patent
Crichton

(10) Patent No.: US 9,605,764 B2
(45) Date of Patent: Mar. 28, 2017

(54) LIQUID CONTROL VALVE

(71) Applicant: APEX VALVES LIMITED, Auckland (NZ)

(72) Inventor: David Gordon Arthur Crichton, Rodney (NZ)

(73) Assignee: APEX VALVES LIMITED (NZ)

( * ) Notice: Subject to any disclaimer, the term of this patent is extended or adjusted under 35 U.S.C. 154(b) by 143 days.

(21) Appl. No.: 14/382,448

(22) PCT Filed: Feb. 27, 2013

(86) PCT No.: PCT/NZ2013/000021
§ 371 (c)(1),
(2) Date: Sep. 2, 2014

(87) PCT Pub. No.: WO2013/129943
PCT Pub. Date: Sep. 6, 2013

(65) Prior Publication Data
US 2015/0184763 A1 Jul. 2, 2015

(30) Foreign Application Priority Data
Mar. 2, 2012 (NZ) ........................................ 598546

(51) Int. Cl.
*F16K 31/18* (2006.01)
*F16K 7/12* (2006.01)
(Continued)

(52) U.S. Cl.
CPC ................ *F16K 7/12* (2013.01); *F16K 31/26* (2013.01); *F16K 31/3835* (2013.01);
(Continued)

(58) Field of Classification Search
CPC ........... Y10T 137/331; Y10T 137/7374; Y10T 137/7404; Y10T 137/7407; Y10T 137/741;
(Continued)

(56) References Cited

U.S. PATENT DOCUMENTS

| 1,374,244 | A | * | 4/1921 | Silvernale | ........... F16K 31/3835 251/38 |
| 2,588,242 | A | * | 3/1952 | Hunter | .................... F16K 47/02 137/414 |

(Continued)

OTHER PUBLICATIONS

International Search Report for PCT/NZ2013/000021.

*Primary Examiner* — Craig J Price
(74) *Attorney, Agent, or Firm* — Garcia-Zamor IP Law; Ruy M. Garcia-Zamor

(57) ABSTRACT

A float or a near neutral buoyancy weight operated liquid pressure control valve includes a body which together with an end cap form a cavity and retain a diaphragm therein. A back-pressure chamber is formed between the end cap and the diaphragm and the diaphragm includes a seal section which seats on an inlet port. The diaphragm seal also separates the inlet from an outlet formed in the body. A float support arm reciprocally operates a valve opening and closing control pin mounted in an associated bleed passage formed longitudinally through a control pin mounting. In an open mode the bleed passage vents the chamber. In a closed mode the pressure in the chamber displaces the diaphragm to close the valve. A slide is coupled to the diaphragm so as to be displaced therewith and prevent excessive pressure to distort the diaphragm once the seal closes on port.

5 Claims, 2 Drawing Sheets

(51) Int. Cl.
  *F16K 31/383* (2006.01)
  *F16K 31/385* (2006.01)
  *F16K 31/26* (2006.01)
  *F16K 33/00* (2006.01)

(52) U.S. Cl.
  CPC .......... *F16K 31/3855* (2013.01); *F16K 33/00* (2013.01); *Y10T 137/7465* (2015.04)

(58) Field of Classification Search
  CPC ......... Y10T 137/7895; Y10T 137/7896; Y10T 137/27; Y10T 137/479; Y10T 137/7465; F16K 31/128; F16K 31/126; F16K 31/24; F16K 31/30; F16K 31/18; F16K 31/365; F16K 31/385; F16K 15/142; F16K 31/26; F16K 31/3835; F16K 31/3855; F16K 33/00; F16K 7/12
  USPC ........ 137/411–414, 441, 443, 218, 859, 860, 137/423–425
  See application file for complete search history.

(56) References Cited

U.S. PATENT DOCUMENTS

| | | | | |
|---|---|---|---|---|
| 2,986,155 A * | 5/1961 | Doyle | ....................... | E03D 1/32 137/218 |
| 3,495,803 A * | 2/1970 | Schmuck | ................... | E03D 1/32 137/414 |
| 3,669,138 A * | 6/1972 | Schoepe | ................. | F16K 31/26 137/218 |
| 3,693,649 A * | 9/1972 | Gordon | .................... | F16K 31/34 137/414 |
| 3,760,839 A * | 9/1973 | Hyde | ...................... | F16K 31/18 137/217 |
| 4,100,928 A * | 7/1978 | Schoepe | ................. | F16K 31/34 137/15.18 |
| 5,904,176 A * | 5/1999 | Li | ............................. | E03D 1/32 137/414 |
| 6,035,888 A * | 3/2000 | Gil | ......................... | F16K 31/34 137/413 |
| 6,244,292 B1 * | 6/2001 | Antunez | ................. | F16K 21/18 137/218 |
| 6,595,236 B2 * | 7/2003 | Herlihy | .................... | F16K 31/34 137/413 |
| 6,712,090 B1 * | 3/2004 | Brandelli | .................... | E03D 1/32 137/410 |
| 7,647,938 B2 * | 1/2010 | Jobe | .......................... | E03D 1/32 137/15.26 |
| 9,260,848 B1 * | 2/2016 | Brandelli | ............... | F16K 31/126 |
| 2008/0121287 A1 * | 5/2008 | Crichton | ................... | F16K 21/18 137/414 |
| 2014/0174566 A1 * | 6/2014 | Crichton | ............... | F16K 31/385 137/511 |

* cited by examiner

LIQUID CONTROL VALVE

TECHNICAL FIELD

This invention relates to liquid pressure control valves and in particular such valves that include a flexible element that is displaced by liquid pressure acting on a face thereof to close against a valve seat to provide a closed mode for the valve.

BACKGROUND OF THE INVENTION

Liquid pressure control valves of this nature are well known for the control of water pressure, the flexible member typically being a diaphragm. A drawback with these valves is the possibility that excess closing pressure may cause the flexible member to collapse or distort and thus destroy its closing capability. Extreme cases have resulted in the flexible member fracturing necessitating replacement. To overcome or at least limit these problems it is known to provide a rigid backing element, typically a metal plate, associated with the flexible member to prevent or at least effectively limit excessive displacement or distortion thereof. Such an arrangement is disclosed in our patent NZ Patent # 328862. A drawback with providing such a plate is that it can tend to impede the liquid flow through the valve.

An object of this invention is to provide a liquid pressure control valve that includes a flexible member as aforesaid and which also includes a displacement and distortion limiting element therefor that has minimal if any impediment on the flow through the valve. A further object is to provide the public with a useful choice.

DISCLOSURE OF THE INVENTION

According to a first embodiment of this invention there is provided including a body forming a cavity and incorporating an inlet port and an outlet port joining to the cavity, a flexible member retained within the cavity to extend over the inlet port to separate the inlet port from the outlet port and to also form a chamber separated from the outlet port, a controlled bleed passage joining the inlet to the chamber, other than in an open mode of the valve, whereby inlet pressure in the chamber will displace the flexible member toward a closed mode with a seal of the flexible member seated over the inlet port, with in the open mode the bleed passage venting the chamber, characterised in that a slide is mounted within the cavity and is coupled to a section of the flexible member surrounding the seal thereof as to be displaced with displacement of the flexible member, and a stop to prevent closing displacement of the slide after the has seated over the inlet port.

According to a second embodiment of the invention there is provided a valve as described in the preceding paragraph wherein the flexible member is in the form of a diaphragm with the body retaining an outer peripheral section of the diaphragm, the diaphragm including a central dished section formed by an annular wall section disposed substantially normal to the central section with the junction of these two sections forming the seal, the slide being coupled to the annular wall section of the diaphragm.

According to a third embodiment of the invention there is provided liquid pressure control valve including a body forming a cavity and incorporating an inlet port and an outlet port joining to the cavity, a flexible member retained within the cavity to extend over the inlet port to separate the inlet port from the outlet port and to also form a chamber separated from the outlet port, a controlled bleed passage joining the inlet to the chamber other than in an open mode of the valve, whereby inlet pressure in the chamber will displace the flexible member toward a closed mode with a seal of the flexible member seated over the inlet port, and in the open mode the bleed passage venting the chamber, an actuating arm pivotally mounted to the body to reciprocally operate a pin including a pair of longitudinally spaced apart grooves mounted in the bleed passage with the bleed passage including a pair of complementary longitudinally spaced apart seals to seal against the pin, whereby in the closed mode a first of the seals is bridged by a first of the grooves to join the inlet to the chamber and the second groove is disposed clear of the second seal which thus closes a vent from the chamber and, in an open mode, the first groove is disposed clear of the first seal to close the bleed passage between the inlet and the chamber and the second groove is disposed to bridge the second seal to vent the chamber, a slide mounted within the cavity and coupled to a section of the flexible member surrounding the seal thereof as to be displaced with displacement of the flexible member, and a stop to prevent closing displacement of the slide after the seal has seated over the inlet port.

According to a fourth embodiment of the invention there is provided liquid pressure control valve as described in any one of the three immediately preceding paragraphs adapted to be operated by either a float or a near neutral buoyancy weight connected to an actuator arm pivotally mounted to the body to reciprocally operate a pin, including a pair of longitudinally spaced apart grooves, mounted in the bleed passage between a valve open mode and a valve closed mode, to that end the bleed passage including a pair of complementary longitudinally spaced apart seals to seal against the pin, whereby in the closed mode a first of the seals is bridged by a first of the grooves to join the inlet to the chamber and the second groove is disposed clear of the second seal which thus closes a vent from the chamber and, in an open mode, the first groove is disposed clear of the first seal to close the bleed passage between the inlet and the chamber and the second groove is disposed to bridge the second seal to vent the chamber.

BRIEF DESCRIPTION OF THE INVENTION

In further describing the invention reference is made to the accompanying drawings wherein.

BEST MODE OF CARRYING OUT THE INVENTION

Figure 1:
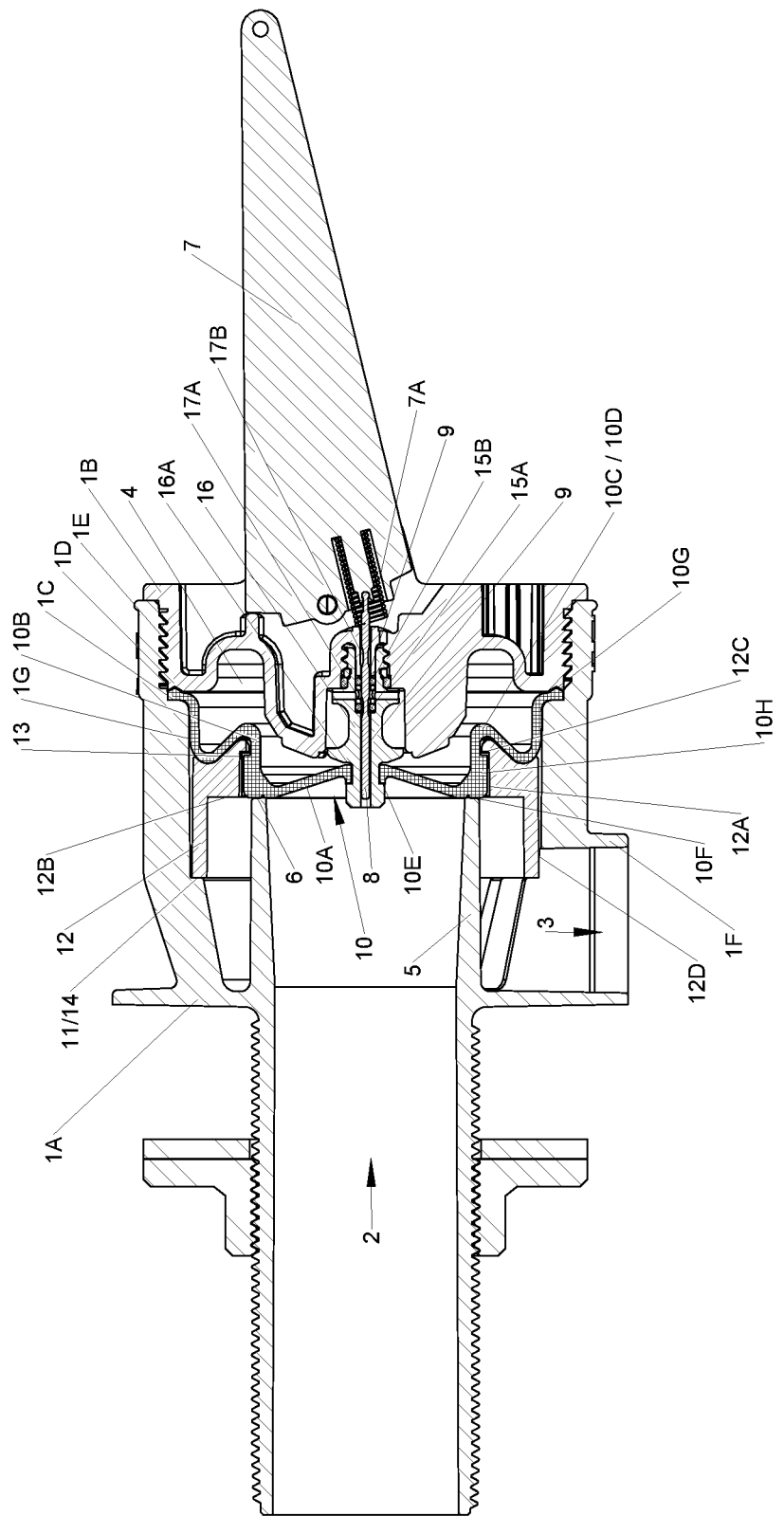
FIG. 1 is a cross-sectional view depicting the valve in a closed mode.

A valve suitable for controlling a pressurised inlet water supply to a typical farm reservoir or animal drinking trough includes a body 1A. A screw-threaded spigot (to retain a mounting nut) preferably forms one end section of the body 1A to provide an inlet 2. The other end section of the body 1A is of an increased diameter to form a cavity open at that end. A removable end cap 113 is located in the cavity end of the body 1A to enclose the cavity within the valve. The inner end of the inlet 2 terminates with an annular wall 5 extending into the cavity. The body 1A and end cap 1B are preferably joined by engaging screw-threads 1E provided on each. The body 1A also includes a spigot IF extending radially outward from a portion of the wall thereof surrounding the inner inlet wall 5 to form an outlet 3 for the valve.

A flexible member 10 is mounted within the cavity and separates the inlet 2 from the end cap 1B to form a back-pressure chamber 4 (inlet 2 being connected to chamber 4 as described below) between the flexible member 10 and the end cap 1B. The inner end of the wall 5 forms a valve seat 6 against which the flexible member 10 seats, the flexible member 10 also separating (providing for opening and closing of the valve) the inlet 2 from the outlet 3, both these functions being described in more detail below, An actuator arm 7 is pivotally mounted at an inner end thereof to end cap 1B. In known manner, a float (not depicted) can be attachable to the outer end of arm 7 to provide for the raising and lowering thereof. Alternatively, rather than a float a "near neutral buoyancy weight" as described in our NZ patent 535912 can be attached thereto. Arm 7 reciprocally operates a valve opening and closing control pin 8 mounted in an associated bleed passage 9 formed longitudinally through a control pin 8 mounting 16. Mounting 16 is mounted to an inner central section of the housing 1B and extends therefrom to project through the flexible member 10. The flexible member 10 is preferably in the form of a diaphragm as described in more detail below. The surface area of the diaphragm 10 presented to the chamber 4 is larger than that surface area thereof presented to the inlet 2. The bleed passage 9 joins the inlet 2 to the chamber 4 to thus provide the "back-pressure" within the chamber 4. The bleed passage 9 also vents the chamber 4 to enable the valve to close and open respectively. To that end the pin 8 by being connected to the actuator arm 7 is slid back and forth within the bleed passage 9 with raising and lowering of the actuator arm 7. More particularly a pair of longitudinally spaced apart seals 15, preferably "O"-rings, are mounted in the bleed passage 9 to seal about the pin 8. The pin 8 includes a pair of longitudinally spaced apart grooves 17, the spacing of the grooves 17 being complementary to the spacing of the seals 15. In the closed mode a first of the seals 15A is bridged by a first of the grooves 17A to join the inlet 2 to the chamber 4. Also the second groove 17B is disposed clear of the second seal 15B which closes the vent section of the bleed passage 9 from the chamber 4. In an open mode the first groove 17A is disposed clear of the first seal 15A to close the bleed passage 9 between the inlet 2 and the chamber 4 and the second groove 17B is disposed to bridge the second seal 15B to vent the chamber 4.

Thus, in a first mode (float arm 7 raised) the bleed passage 9 connects the chamber 4 to the inlet 2 and, owing to the larger surface area of the diaphragm 10 presented to the chamber 4, the diaphragm 10 displaces toward the valve seat 6 and closes thereagainst. In that mode the venting of the chamber 4 is closed. In a second mode (arm 7 lowered) the bleed passage 9 vents the chamber 4 thus enabling the diaphragm 10 to displace away from the valve seat 6 and the valve to open.

The diaphragm 10 is preferably dish shaped having a central section 10A surrounded by an annular wall section 10B disposed substantially normal or uprightly to the central section 10A. The thickness of the diaphragm 10 is preferably enlarged at the corner junction of the two sections 10A and 10B and the inlet 2 associated face of the diaphragm 10 at that corner junction forms a seal 10F for the valve. Seal 10F impinges against the valve seat 6 to close the valve. The diaphragm 10 is retained about its periphery preferably between abutting shoulders 1C and 1D provided on each of the housing parts 1A and 1B adjacent the screw-threaded junction 1E therebetween. Preferably, as more clearly depicted in FIG. 1, the shoulders 1C and 1D are longitudinally spaced from the valve seat 6 an amount commensurate to the extent of dishing of the diaphragm 10 provided by the annular wall section 10B thereof. Preferably the peripheral rim of the diaphragm 10 includes an upstanding rib 10G which is compressed between the shoulders 1C and 1D with the mounting of the end cap 1B to the body 1A.

Between the annular wall section 10B and the peripheral rim/rib 10G of the diaphragm 10 an intermediate flexing section 10C is provided. Preferably diaphragm section 10C includes an annularly disposed wave formation 10D that facilitates the diaphragms longitudinal flexing and displacement with opening of the valve to the "open" position depicted in FIG. 2. As aforesaid, the pin mounting 16 extends through the diaphragm 10, the pin mounting 16 preferably including an annular channel 16A in which a central tubular wall section 10E of the diaphragm 10 sealingly located and anchored. Also, referring in particular to FIG. 1, in the closed mode preferably the central section 10A is marginally conically formed to anchor the central wall section 10E forward, relative to the displacement movement of the diaphragm 10, of the seal 10F thereof.

A slide 12 is coupled to the annular wall section 10B of the diaphragm 10 as to be displaced therewith. Preferably the slide 12 is annularly shaped having an outer longitudinally extending wall 12D with an inwardly extending shoulder 12B, preferably of an increased wall thickness, at a forward end thereof. The wall 12D of the slide 12 is a sliding fit within the inner face or bore 1G of the section of the body 1A forming the cavity of the valve. A recess 12A is formed in the inner wall 12D of wall 12B to form an annular inwardly disposed lip 12C. The annular wall section 10B of the diaphragm 10 includes an outwardly disposed enlargement 10H forming a shoulder 13, the enlargement 10H locating in the recess 12A of the slide 12 with the lip 12C fitting over shoulder 13 to couple the diaphragm 10 and slide 12 together.

Figure 2:
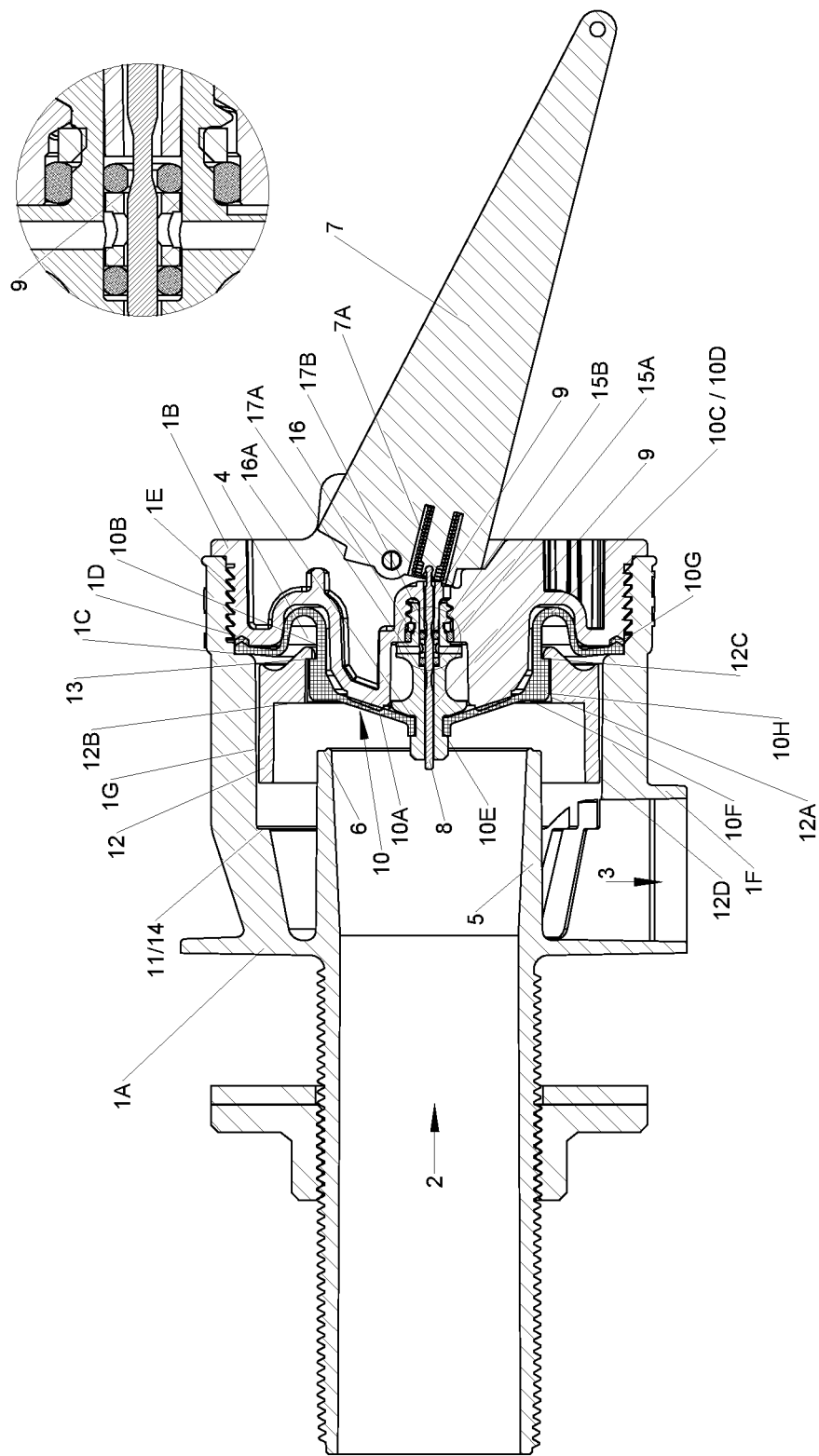
FIG. 2 is a cross-sectional view depicting the valve in an open mode.

A section of wall 12D is spaced radially outward of and, in the closed mode, extends around the inner wall 5 of the inlet 1. The "closing" travel of the slide 12 is limited by a stop 11 provided by the shoulder 14 formed on the face or bore 1G of the body 1B. With closing of the valve, as the seal 10F impinges on the valve seat 6, the associated end of the slide 12 abuts the shoulder 14 to prevent further closing travel of the slide 12. Preferably the stop 11 comes into play just before complete seating of the seal 10F on seat 6 takes place, full closure requiring some minimal compression of the diaphragm 10 against the seat 6. Thus the slide 12 prevents undue distortion of the diaphragm 10 particularly once the valve has fully closed. Referring to FIG. 2, the longitudinal spacing of seat 6 relative to the outlet 3 and the length of the slide 12 provide that, with displacement of the diaphragm 10 to the fully open mode, the slide 12 is spaced clear of the outlet 3 and thus presents little or no impediment to the liquid flow through the valve.

The invention claimed is:

1. A liquid pressure control valve including a body forming a cavity and incorporating an inlet port and an outlet port joining to the cavity and forming a flow path for a liquid through the body, a flexible member retained within the cavity to extend over the inlet port to separate the inlet port from the outlet port and to also form a chamber separated from the outlet port, a bleed passage joining the inlet port to the chamber, in a closed position of the liquid pressure control valve, whereby pressure in the chamber will displace the flexible member toward the closed position with a seal of the flexible member seated over the inlet port, within an open position the bleed passage venting the chamber, characterised in that a slide is mounted within the cavity and is coupled to a section of the flexible member surrounding the seal of the inlet port, the slide is formed of a rigid material and is configured to be displaced with displacement of the flexible member, and a stop provided to prevent closing displacement of the slide after the flexible member has seated and sealed over the inlet port in the closed position, wherein the flexible member is in the form of a diaphragm with a diaphragm body retaining an outer peripheral section of the diaphragm, the diaphragm including a central dished section surrounded by an annular wall section disposed substantially normal to the central dished section with a junction of the annular wall section and the central dished section forming the seal, the slide being coupled to the annular wall section of the diaphragm to enable the diaphragm in the open position to move the slide out of the flow path to achieve maximum fluid flow through the outlet port, wherein a section of the diaphragm adjacent to the outer peripheral section incorporates at least one annularly disposed wave formation to facilitate longitudinal displacement of the central dished section of the diaphragm.

2. The liquid pressure control valve as claimed in claim 1 wherein the stop is disposed to abut the slide just before complete closure of the liquid pressure control valve, full closure requiring some minimal compression of the diaphragm.

3. A liquid pressure control valve including a body forming a cavity and incorporating an inlet port and an outlet port joining to the cavity and forming a flow path for a liquid through the body, a flexible member retained within the cavity to extend over the inlet port to separate the inlet port from the outlet port and to also form a chamber separated from the outlet port, a bleed passage joining the inlet port to the chamber, in a closed position of the liquid pressure control valve, whereby pressure in the chamber will displace the flexible member toward the closed position with a seal of the flexible member seated over the inlet port, within an open position the bleed passage venting the chamber, characterised in that a slide is mounted within the cavity and is coupled to a section of the flexible member surrounding the seal of the inlet port, the slide is formed of a rigid material and is configured to be displaced with displacement of the flexible member, and a stop provided to prevent closing displacement of the slide after the flexible member has seated and sealed over the inlet port in the closed position, wherein the flexible member is in the form of a diaphragm with a diaphragm body retaining an outer peripheral section of the diaphragm, the diaphragm including a central dished section surrounded by an annular wall section disposed substantially normal to the central dished section with a junction of the annular wall section and the central dished section forming the seal, the slide being coupled to the annular wall section of the diaphragm to enable the diaphragm in the open position to move the slide out of the flow path to achieve maximum fluid flow through the outlet port,
the liquid pressure control valve being adapted to be operated by either a float or a near neutral buoyancy weight connected to an actuator arm pivotally mounted to the body to reciprocally operate a pin, including first and second grooves being longitudinally spaced apart, mounted in the bleed passage between the open position and the closed position, to that end the bleed passage including first and second bleed passage seals being longitudinally spaced apart to seal against the pin, whereby in the closed position the first bleed passage seal is bridged by the first groove to join the inlet port to the chamber and the second groove is disposed clear of the second bleed passage seal which thus closes a vent from the chamber and, in an open mode, the first groove is disposed clear of the first bleed passage seal to close the bleed passage between the inlet port and the chamber and the second groove is disposed to bridge the second bleed passage seal to vent the chamber.

4. A liquid pressure control valve including a body forming a cavity and incorporating an inlet port and an outlet port joining to the cavity and forming a flow path for a liquid through the body, a flexible member retained within the cavity to extend over the inlet port to separate the inlet port from the outlet port and to also form a chamber separated from the outlet port, a bleed passage joining the inlet port to the chamber, in a closed position of the liquid pressure control valve, whereby pressure in the chamber will displace the flexible member toward the closed position with a seal of the flexible member seated over the inlet port, within an open position the bleed passage venting the chamber, characterised in that a slide is mounted within the cavity and is coupled to a section of the flexible member surrounding the seal of the inlet port, the slide is formed of a rigid material and is configured to be displaced with displacement of the flexible member, and a stop provided to prevent closing displacement of the slide after the flexible member has seated and sealed over the inlet port in the closed position, wherein the flexible member is in the form of a diaphragm with a diaphragm body retaining an outer peripheral section of the diaphragm, the diaphragm including a central dished section surrounded by an annular wall section disposed substantially normal to the central dished section with a junction of the annular wall section and the central dished section forming the seal, the slide being coupled to the annular wall section of the diaphragm to enable the diaphragm in the open position to move the slide out of the flow path to achieve maximum fluid flow through the outlet port,
wherein the inlet port terminates with an annular wall extending into the cavity with an inner end of the annular wall forming a valve seat and a surrounding section of the annular wall forms a bore, the seal of the flexible member seals against the valve seat, the slide being annularly shaped to surround the inner end and be a working fit within the bore, and
wherein the slide includes an inwardly extending annular shoulder at a forward end of the slide, the forward end of the slide being the end furthest from the outlet port in an axial direction when the liquid pressure control valve is in the open position, an inner wall of the shoulder including a recess in which an enlargement on the diaphragm locates to couple the slide and diaphragm together, wherein a radially innermost portion of the slide is located at the forward end.

5. The liquid pressure control valve as claimed in claim 4 wherein the longitudinal spacing of the valve seat relative to the outlet port and a length of the slide provide that, with displacement of the diaphragm to the open position, the slide is spaced clear of the outlet port.

* * * * *